(12) United States Patent
Yoo et al.

(10) Patent No.: US 11,430,090 B2
(45) Date of Patent: Aug. 30, 2022

(54) METHOD AND APPARATUS FOR REMOVING COMPRESSED POISSON NOISE OF IMAGE BASED ON DEEP NEURAL NETWORK

(71) Applicant: Electronics and Telecommunications Research Institute, Daejeon (KR)

(72) Inventors: Seok Bong Yoo, Daejeon (KR); Mi Kyong Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 203 days.

(21) Appl. No.: 16/987,027

(22) Filed: Aug. 6, 2020

(65) Prior Publication Data

US 2021/0042887 A1 Feb. 11, 2021

(30) Foreign Application Priority Data

Aug. 7, 2019 (KR) .................. 10-2019-0096044

(51) Int. Cl.
*G06T 5/00* (2006.01)
*G06T 5/10* (2006.01)
(Continued)

(52) U.S. Cl.
CPC .......... *G06T 5/002* (2013.01); *G06N 3/0454* (2013.01); *G06N 3/08* (2013.01); *G06T 5/10* (2013.01);
(Continued)

(58) Field of Classification Search
CPC .......... G06T 5/002; G06T 5/003; G06T 5/10; G06T 5/50; G06T 2207/20052; G06T 2207/20081; G06T 2207/20084; G06T 2207/20224; G06T 2207/20064; G06T 2207/20016; G06T 2207/20182;
(Continued)

(56) References Cited

U.S. PATENT DOCUMENTS 9,235,874 B2 * 1/2016 Voronov .................. G06T 5/50
10,049,323 B1 8/2018 Kim et al.
(Continued)

FOREIGN PATENT DOCUMENTS

KR 10-2019-0052551 5/2019

*Primary Examiner* — Michael S Osinski
(74) *Attorney, Agent, or Firm* — Kile Park Reed & Houtteman PLLC

(57) ABSTRACT

A method for removing compressed Poisson noises in an image, based on deep neural networks, may comprise generating a plurality of block-aggregation images by performing block transform on low-frequency components of an input image; obtaining a plurality of restored block-aggregation images by inputting the plurality of block-aggregation images into a first deep neural network; generating a low-band output image from which noises for the low-frequency components are removed by performing inverse block transform on the plurality of restored block-aggregation images; and generating an output image from which compressed Poisson noises are removed by adding the low-band output image to a high-band output image from which noises for high-frequency components of the input image are removed.

20 Claims, 10 Drawing Sheets

(51) Int. Cl.
 *G06T 5/50* (2006.01)
 *G06N 3/08* (2006.01)
 *G06N 3/04* (2006.01)

(52) U.S. Cl.
 CPC ...... *G06T 5/50* (2013.01); *G06T 2207/20052* (2013.01); *G06T 2207/20081* (2013.01); *G06T 2207/20084* (2013.01); *G06T 2207/20224* (2013.01)

(58) Field of Classification Search
 CPC ...... G06T 3/4053; G06N 3/0454; G06N 3/08; G06N 3/0481; H04N 19/85; H04N 5/217; H04N 19/176; H04N 19/625
 See application file for complete search history.

(56) References Cited

U.S. PATENT DOCUMENTS

| | | | |
|---|---|---|---|
| 10,217,216 B2* | 2/2019 | Wang | G06T 5/20 |
| 10,706,507 B2* | 7/2020 | Mora | G06T 7/136 |
| 11,055,819 B1* | 7/2021 | Singh | G06N 3/0454 |
| 11,250,600 B2* | 2/2022 | Ye | G06T 11/008 |
| 2010/0303367 A1 | 12/2010 | Matsushita et al. | |
| 2013/0011081 A1* | 1/2013 | Luo | G06T 5/002 382/298 |
| 2015/0023611 A1* | 1/2015 | Salvador | G06T 5/003 382/263 |
| 2015/0237375 A1* | 8/2015 | Okamoto | H04N 19/14 375/240.2 |
| 2016/0364840 A1* | 12/2016 | Zhang | G06T 3/4007 |
| 2017/0301095 A1* | 10/2017 | Zhang | G06T 5/007 |
| 2018/0130185 A1 | 5/2018 | Lim et al. | |
| 2018/0336662 A1 | 11/2018 | Kimura | |
| 2019/0050966 A1 | 2/2019 | Kim et al. | |
| 2020/0082282 A1* | 3/2020 | Simpson | G06N 3/126 |
| 2020/0187911 A1* | 6/2020 | Park | G01S 7/52046 |
| 2020/0196972 A1* | 6/2020 | Zhou | A61B 6/5205 |
| 2020/0226718 A1* | 7/2020 | Reddy | G06T 5/002 |
| 2020/0302582 A1* | 9/2020 | Smirnov | G06T 5/003 |
| 2021/0326708 A1* | 10/2021 | Han | G06V 10/82 |

\* cited by examiner

METHOD AND APPARATUS FOR REMOVING COMPRESSED POISSON NOISE OF IMAGE BASED ON DEEP NEURAL NETWORK

CROSS-REFERENCE TO RELATED APPLICATIONS

This application claims priority to Korean Patent Application No. 10-2019-0096044 filed on Aug. 7, 2019 in the Korean Intellectual Property Office (KIPO), the entire contents of which are hereby incorporated by reference.

BACKGROUND

1. Technical Field

The present disclosure relates to a method and an apparatus for removing compressed Poisson noises of an image based on deep neural networks, and more specifically, to a method and an apparatus for removing compressed Poisson noises by introducing a block-aggregation domain instead of a general pixel domain, and enhancing block correlations on the introduced block-aggregation domain.

2. Related Art

Unwanted noises may always be present in all images input from a camera or the like. In particular, noises in images may inevitably occur due to incompleteness of a camera sensor. Also, when an image is acquired in a dark environment, the image deteriorated by noises may be often acquired. As a means for resolving the noises in the image, studies on various filters for removing noises in a post-processing process are being generally conducted. For example, studies for removing noises by calculating an average value of surrounding pixel values using a Gaussian low-pass filter have been conducted. However, these studies have limitations in acquiring a sharp high-quality image by flattening even an edge region while removing the noises.

In order to compensate for these limitations, filters have been devised to improve an image quality for both flat and edge regions while minimizing the amount of computation, and the representative filter is a bilateral filter. However, such the bilateral filter is mainly proposed to remove a general ringing phenomenon or a block phenomenon, and researches to remove compressed Poisson noises generated when an image is compressed through encoding have not been conducted.

The Poisson noises in the image have a characteristic of spatial variation because their standard deviation or variance values vary depending on their positions in the image. In particular, after encoding and compressing the image containing Poisson noises through quantization, and then receiving and decoding the compressed image through dequantization, the Poisson noises in form of randomized dots are transformed into a complex pattern in the restored image.

As described above, although a method for more precisely restoring an image by removing the compressed Poisson noises generated in the process of compressing and restoring the Poisson noises in the image is required, studies to remove such compressed Poisson noises are currently lacking. In addition, neural network techniques such as ARCNN, DnCNN, and MWCNN have been proposed to remove the general ringing phenomenon or block phenomenon, but a method for removing the compressed Poisson noises described above has not been proposed.

SUMMARY

Accordingly, exemplary embodiments of the present disclosure are directed to providing a method for removing compressed Poisson noises of an image based on deep neural networks.

Accordingly, exemplary embodiments of the present disclosure are also directed to providing an apparatus for removing compressed Poisson noises of an image based on deep neural networks.

In order to achieve the objective of the present disclosure, a method for removing compressed Poisson noises in an image, based on deep neural networks, may comprise generating a plurality of block-aggregation images by performing block transform on low-frequency components of an input image; obtaining a plurality of restored block-aggregation images by inputting the plurality of block-aggregation images into a first deep neural network; generating a low-band output image from which noises for the low-frequency components are removed by performing inverse block transform on the plurality of restored block-aggregation images; and generating an output image from which compressed Poisson noises are removed by adding the low-band output image to a high-band output image from which noises for high-frequency components of the input image are removed.

The method may further comprise, after the generating of the plurality of block-aggregation images, generating a low-band input image by performing inverse block transform on the plurality of block-aggregation images; generating a high-band input image by subtracting the low-band input image from the input image; and generating the high-band output image by inputting the high-band input image into a second deep neural network.

The generating of the plurality of block-aggregation images may comprise calculating low-frequency block transform coefficients while moving a block of a fixed size by one pixel on the input image; and generating the plurality of block-aggregation images by using coefficients corresponding to a same low-frequency component among the low-frequency block transform coefficients as pixel values according to block movement positions.

The block transform may be a block discrete cosine transform (DCT).

The first deep neural network may have a structure in which a preconfigured layer architecture is iteratively connected, and a fully-connected layer is included as a last layer.

The preconfigured layer architecture may have a structure in which a local variance stabilization (LVS) layer, a convolution layer, an inverse LVS (ILVS) layer, a batch normalization (BN) layer, and a rectified linear unit (ReLU) layer are sequentially connected.

The LVS layer may perform LVS on the image input to the first deep neural network to adjust an LVS of the compressed Poisson noises within the image input to the first deep neural network to be identical in all positions in the image.

The convolution layer may perform convolution on an output of the LVS layer by using previously-trained convolution parameters.

The convolution parameters of the first deep neural network may be determined by training the first deep neural network so that a mean square error (MSE) between an output of the first deep neural network for a low-band block-aggregation image obtained from a compressed Poisson image and a low-band block-aggregation image obtained from an original image is minimized.

The compressed Poisson image may be an image restored by decoding the original image to which Poisson noises are added while being compressed through encoding.

In order to achieve the objective of the present disclosure, an apparatus for removing a compressed Poisson noise in an image, based on deep neural networks, may comprise at least one processor and a memory storing instructions causing the at least one processor to perform at least one step, wherein the at least one step comprises generating a plurality of block-aggregation images by performing block transform on low-frequency components of an input image; obtaining a plurality of restored block-aggregation images by inputting the plurality of block-aggregation images into a first deep neural network; generating a low-band output image from which noises for the low-frequency components are removed by performing inverse block transform on the plurality of restored block-aggregation images; and generating an output image from which compressed Poisson noises are removed by adding the low-band output image to a high-band output image from which noises for high-frequency components of the input image are removed.

The at least one method may further comprise, after the generating of the plurality of block-aggregation images, generating a low-band input image by performing inverse block transform on the plurality of block-aggregation images; generating a high-band input image by subtracting the low-band input image from the input image; and generating the high-band output image by inputting the high-band input image into a second deep neural network.

The generating of the plurality of block-aggregation images may comprise calculating low-frequency block transform coefficients while moving a block of a fixed size by one pixel on the input image; and generating the plurality of block-aggregation images by using coefficients corresponding to a same low-frequency component among the low-frequency block transform coefficients as pixel values according to block movement positions.

The block transform may be a block discrete cosine transform (DCT).

The first deep neural network may have a structure in which a preconfigured layer architecture is iteratively connected, and a fully-connected layer is included as a last layer.

The preconfigured layer architecture may have a structure in which a local variance stabilization (LVS) layer, a convolution layer, an inverse LVS (ILVS) layer, a batch normalization (BN) layer, and a rectified linear unit (ReLU) layer are sequentially connected.

The LVS layer may perform LVS on the image input to the first deep neural network to adjust an LVS of the compressed Poisson noises within the image input to the first deep neural network to be identical in all positions in the image.

The convolution layer may perform convolution on an output of the LVS layer by using previously-trained convolution parameters.

The convolution parameters of the first deep neural network may be determined by training the first deep neural network so that a mean square error (MSE) between an output of the first deep neural network for a low-band block-aggregation image obtained from a compressed Poisson image and a low-band block-aggregation image obtained from an original image is minimized.

The compressed Poisson image may be an image restored by decoding the original image to which Poisson noises are added while being compressed through encoding.

Using the method and apparatus for removing the compressed Poisson noises of the image based on the deep neural networks according to the present disclosure as described above, the compressed Poisson noises can be effectively removed from the image. In addition, it is possible to adaptively remove the noises for each transform coefficient. In addition, since a deep neural network structure robust to the spatial variation characteristics of the compressed Poisson noises is used, the compressed Poisson noises can be removed by sufficiently considering the spatial variation characteristics.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
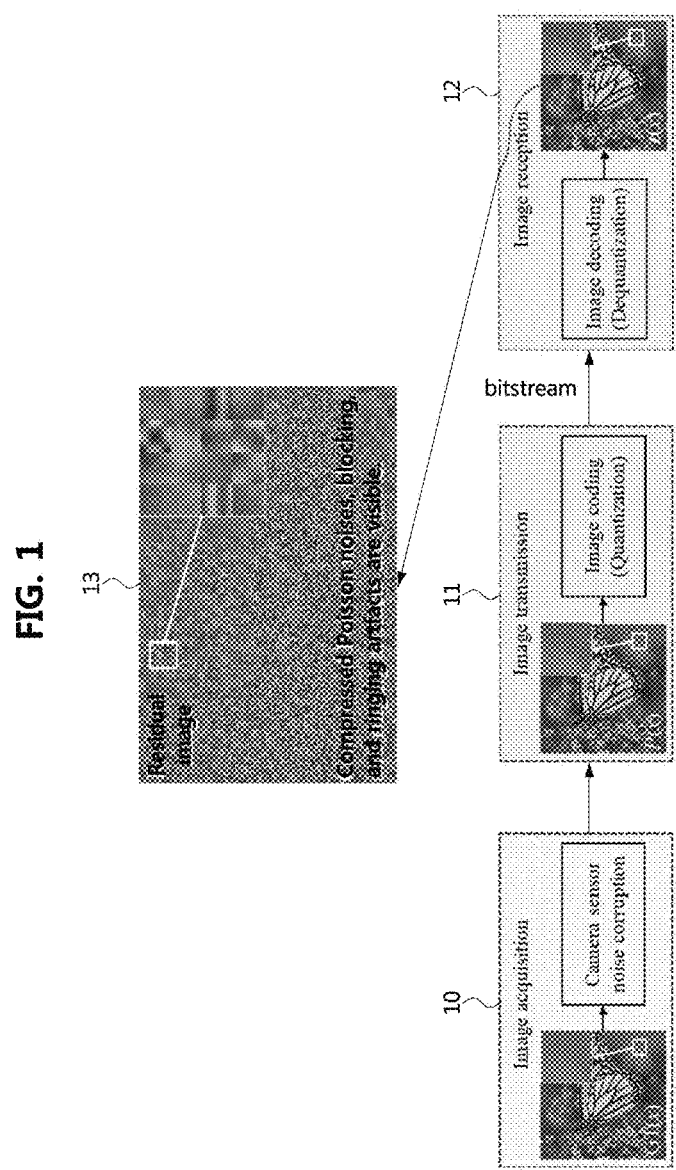
FIG. 1 is a conceptual diagram for describing compressed Poisson noises.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram for describing compressed Poisson noises.

As shown in FIG. 1, a general imaging system may operate based on an image acquisition process 10, an image transmission process 11, and an image reception process 12.

In the image acquisition process 10, an original image GT may be acquired by photographing an object using various image capturing equipment such as a camera. In this case, noises may be included in the acquired original image GT due to incompleteness of a camera sensor. These noises may be referred to as Poisson noises. Also, the original image including the Poisson noises may be referred to as a noise image P.

Meanwhile, the noise image P including the Poisson noises may be encoded through quantization in the image transmission process 11, and the encoded image may be transmitted to a receiving end in form of a bit stream. As an example of the encoding method, the noise image P may be divided into blocks, prediction blocks may be generated based on correlation between blocks in the same or different frames, and difference blocks between the generated prediction blocks and the original blocks may be encoded.

In the mage reception process 12, a reconstructed image z may be acquired by decoding the bit stream delivered to the receiving end through dequantization, etc. Meanwhile, the Poisson noises, which were included in the noise image P during the image acquisition process 10, may be generated as transformed in the reconstructed image.

Specifically, FIG. 1 shows a residual image 13 obtained through a difference between the original image (i.e., ground truth (GT)) before the Poisson noises occur in the image acquisition process 10 and the reconstructed image z reconstructed in the image reception process 12. Looking at the residual image 13, it can be observed that a complex pattern noise exists even in a flat region where there was no image signal. The Poisson noises appear as transformed in the reconstructed image in the process of compressing and restoring the image, as can be seen through the residual image 13, and the Poisson noises appearing in the reconstructed image may be referred to as compressed Poisson noises. Also, the reconstructed image in which the Poisson noises included in the original image appear as transformed during encoding and decoding may be referred to as a compressed Poisson noise image below.

Figure 2:
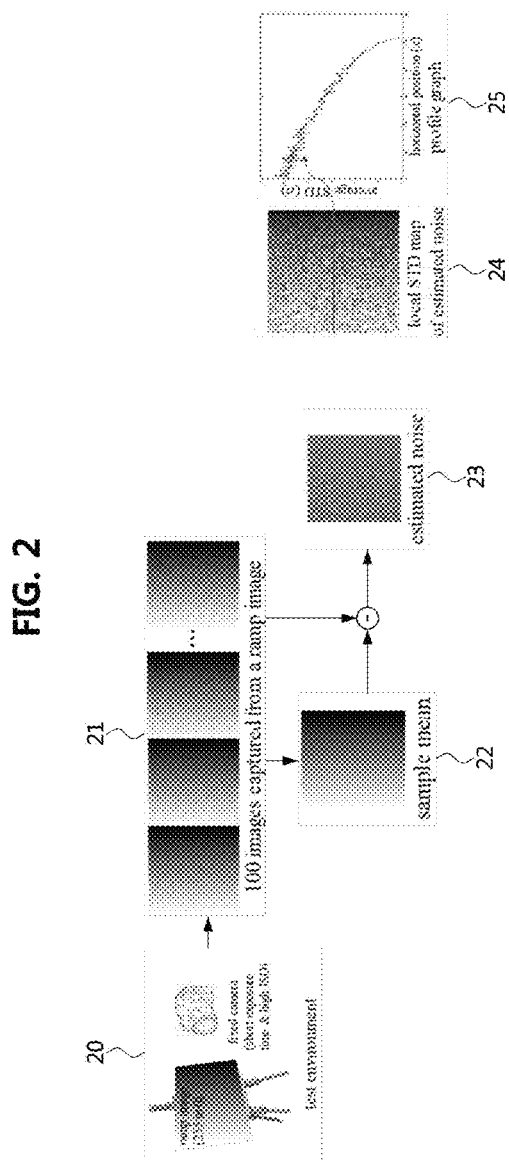
FIG. 2 is a conceptual diagram illustrating an experimental method for observing characteristics of compressed Poisson noises.

FIG. 2 is a conceptual diagram illustrating an experimental method for observing characteristics of compressed Poisson noises.

In an exemplary embodiment of the present disclosure, in order to observe the characteristics of the Poisson noises, a test environment as shown in FIG. 2 was provided. Specifically, referring to the test environment 20 in FIG. 2, in a dark lighting environment, a ramp image in which a brightness is changed in a horizontal direction in form of a ramp function was prepared, and the ramp image was taken with a fixed camera. In this case, the fixed camera was configured to have a short exposure time and a high ISO value.

In the test environment 20, 100 images 21 were acquired by photographing the ramp image 100 times. Through the 100 photographed images 21, it was easily confirmed that noises (or Poisson noises) were included in the images. Meanwhile, a sample mean image 22 from which the noises were removed was obtained by averaging 100 photographed images. Then, an estimated noise image 23 was obtained by extracting only the noises using differential images between the sample mean image 22 and 100 photographed images 21. In order to identify the characteristics of the noises through the noise image, a local standard deviation (local STD) image 24 for the estimated noise image was calculated, and an average standard deviation according to the horizontal direction of the calculated local STD image 24 is as shown in a graph 25 of FIG. 2. As can be seen through the graph 25, it was confirmed that the standard deviation of noises (i.e., y-axis of the graph) changes in the horizontal direction. That is, it can be seen that the noises have a characteristic that changes according to the spatial position in the image (hereinafter referred to as a 'spatial variation characteristic').

Therefore, referring again to FIG. 1, when the image with Poisson noises having such the spatial variation characteristics is encoded and decoded, the compressed Poisson noises having the irregularly complex patterns and the spatial variation characteristics appear as shown in the residual image 13 of FIG. 1.

Accordingly, an exemplary embodiment of the present disclosures proposes a method and an apparatus for removing the compressed Poisson noises by sufficiently taking into account the spatial variation characteristics described above.

Figure 3:
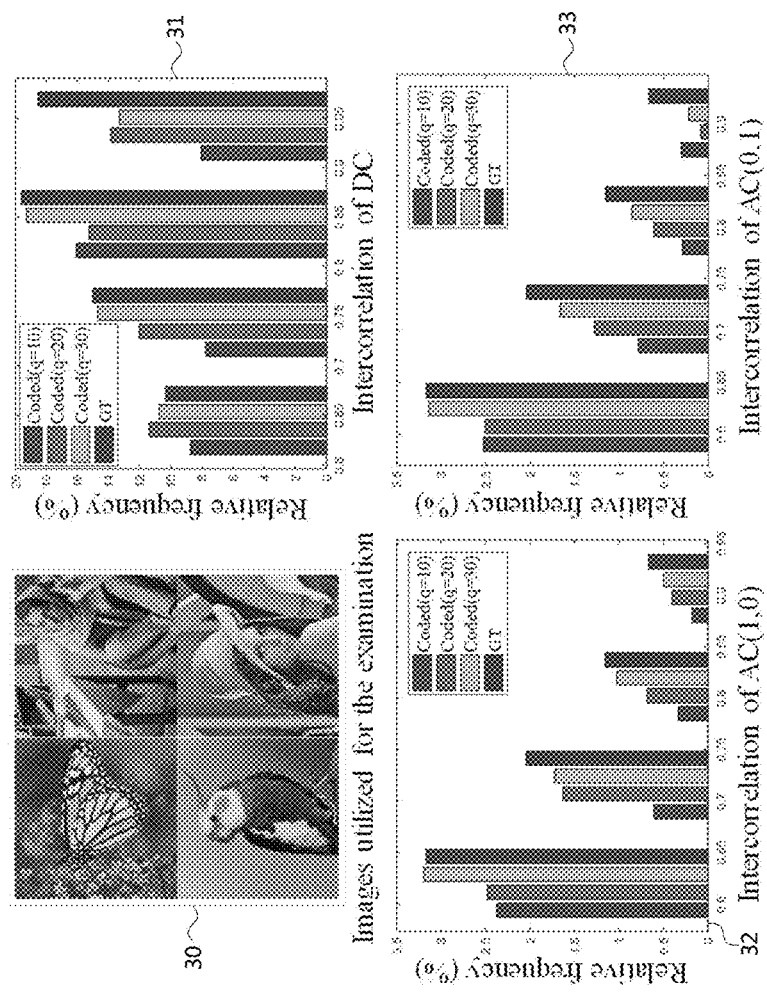
FIG. 3 is a graph illustrating a distribution of correlation between blocks in an image according to an image compression level.

FIG. 3 is a graph illustrating a distribution of correlation between blocks in an image according to an image compression level.

In order to observe an inter-block correlation distortion as the block-based encoding is performed, the inter-block correlation according to the encoding was tested on an image 30. Specifically, the image 30 was compressed at compression levels (QF=10, 20, 30) according to various JPEG quality factors (QFs) corresponding to a low transmission rate and a high compression rate, and a distribution of correlations between blocks was obtained.

A graph 31 shows a distribution of correlations between blocks according to DC coefficients of a frequency transform (e.g., discrete cosine transform (DCT)) in the image 30, and graphs 32 and 33 show distributions of correlations between blocks according to AC coefficients.

Considering the distribution of correlations between blocks according to the DC coefficients which are low-frequency transform coefficients in the graph 31, the correlations had a tendency to decrease as the compression level (QF) increased. On the other hand, considering the distribution of correlations between blocks according to the AC coefficients which are high-frequency coefficients in the graphs 32 and 33, a tendency not coincident with the above tendency was shown.

From these results, a correlation enhancement technique for low-frequency transform coefficients is needed to effectively reconstruct a compressed image based on a low bit rate block. Therefore, an exemplary embodiment of the present disclosure also proposes such the correlation enhancement technique.

Figure 4:
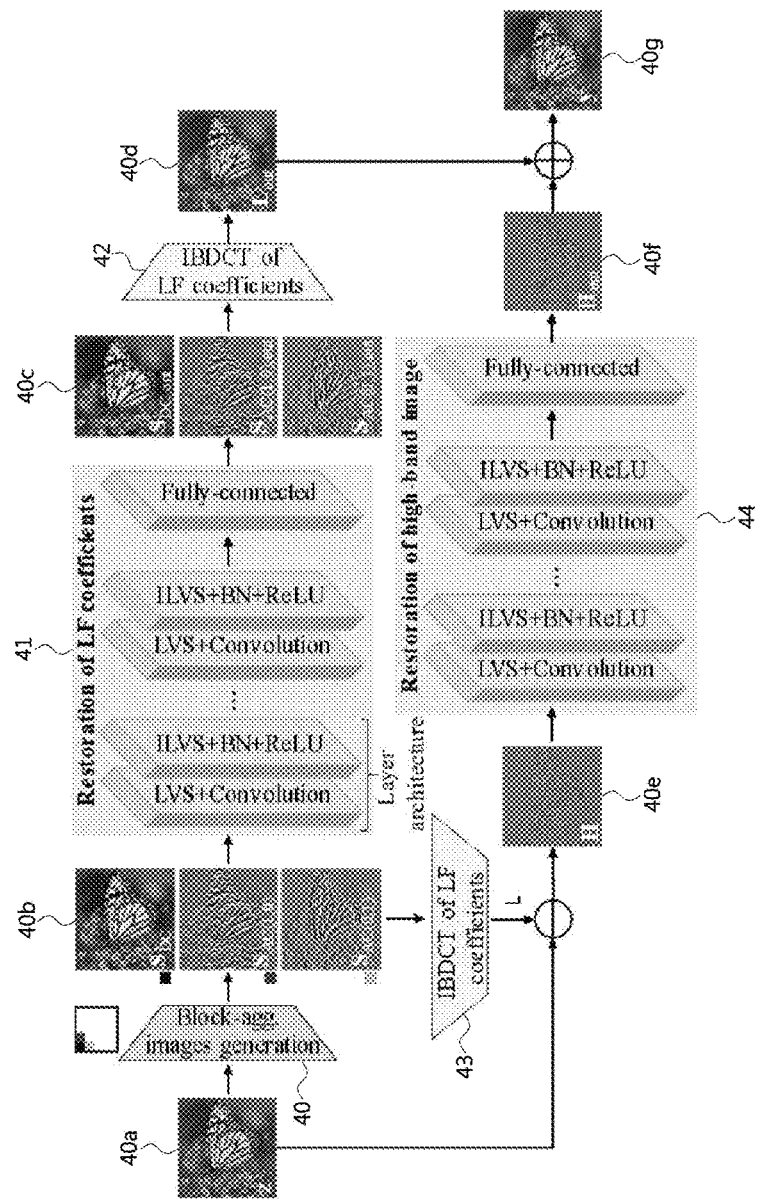
FIG. 4 is a conceptual diagram illustrating a method of removing compressed Poisson noises of an image based on deep neural networks according to an exemplary embodiment of the present disclosure.

FIG. 4 is a conceptual diagram illustrating a method of removing compressed Poisson noises of an image based on deep neural networks according to an exemplary embodiment of the present disclosure.

As shown in FIG. 4, a method of removing compressed Poisson noises of an image based on deep neural networks may be performed through a block-aggregation image generation unit 40, a low-frequency coefficient restoration unit 41, a first low-frequency coefficient inverse block transform (IBDCT) unit 42, a second low-frequency coefficient inverse block transform unit 43, and a high-band image restoration unit 44.

The block-aggregation image generation unit 40 may calculate a plurality of low-frequency block transform coefficients for an input image 40a including compressed Poisson noises, and may use the calculated plurality of low-frequency block transform coefficients to generate a plurality of block-aggregation images 40b. In particular, each of the plurality of block-aggregation images 40b may have the same size as the input image 40a, and may be an image having low-frequency transform coefficients as pixel values.

The low-frequency coefficient restoration unit 41 may remove the noises included in the plurality of block-aggregation images 40b by augmenting block correlations in the images distorted by compression, and restore the plurality of block-aggregation images 40b close to the uncompressed original block-aggregation image and output a plurality of restored block-aggregation images 40c. In this case, a first deep neural network according to the low-frequency coefficient restoration unit 41 may be configured in a structure in which a specific layer architecture is iterated multiple times.

The first low-frequency coefficient inverse block transform unit 42 may perform inverse block transformation on the plurality of restored block-aggregation images 40c to output an output low-band image 40d. Specifically, the first low-frequency coefficient inverse block transform unit 42 may perform the inverse block transform while moving the plurality of restored block-aggregation images 40c by a block size without overlapping.

Meanwhile, the second low-frequency coefficient inverse block transform unit 43 may perform inverse block transform on the plurality of block-aggregation images 40b generated by the block-aggregation image generation unit 40 to output an input low-band image 40e. Specifically, the second low-frequency coefficient inverse block transform unit 43 may perform the inverse block transform while moving the plurality of block-aggregation images 40b by a block size without overlapping. In this case, an input high-band image 40e may be derived by subtracting the input low-band image 40e from the input image 40a.

The high-band image restoration unit 44 may input the input high-band image 40e into a second deep neural network, and obtain an output high-band image 40f as an output of the second deep neural network. The second deep neural network may be configured in a structure in which a specific layer architecture is iterated a plurality of times, similarly to the first deep neural network.

Finally, the output high-band image 40f and the output low-band image 40d may be summed to obtain an output image 40g in which the compressed Poisson noises are removed.

In the exemplary embodiment of the present disclosure, a discrete cosine transform (DCT) may be used as the block transformation scheme, but is not limited thereto.

Figure 5:
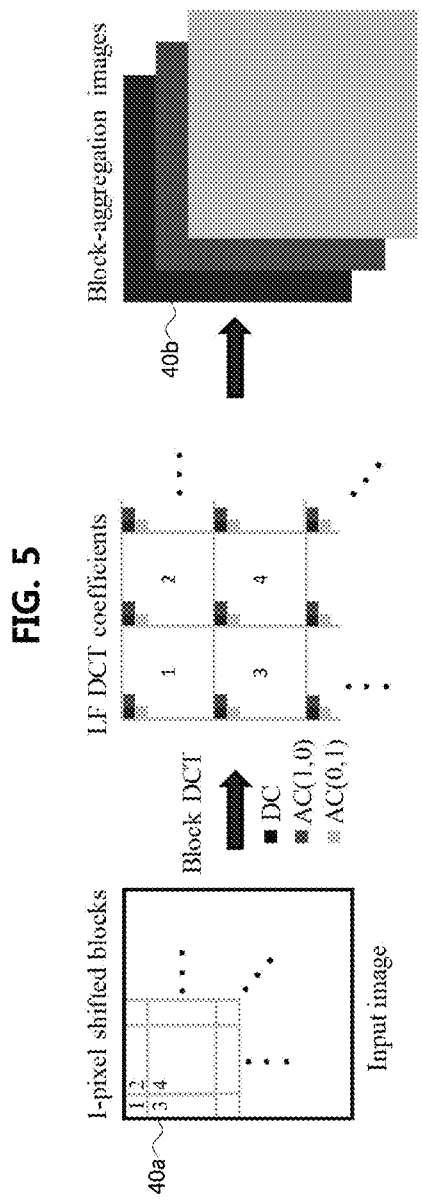
FIG. 5 is a conceptual diagram illustrating a process of generating a block-aggregation image according to an exemplary embodiment of the present disclosure.

FIG. 5 is a conceptual diagram illustrating a process of generating a block-aggregation image according to an exemplary embodiment of the present disclosure.

As shown in FIG. 5, low-frequency block transform coefficients (referred to as 'LF DCT coefficients' under the assumption of the block DCT transform) may be calculated while moving a block of a fixed size by one pixel on the input image 40a. When an image is represented so that the coefficients of the same low-frequency component, among the low-frequency block transformation coefficients (DC, AC (1,0), AC (0,1) in the drawing) obtained from each block movement, correspond to pixel values according to the block movement position, one block-aggregation image may be obtained. For example, when the low-frequency coefficients corresponding to a DC component are expressed as pixel values according to the block movement position, the block-aggregation image for the DC component may be generated.

In the drawing, three block-aggregation images are generated using only DC, AC (1,0), and AC (0,1) coefficients, but the present disclosure is not limited thereto. A few block-aggregation images may be generated using the low-frequency coefficients.

The generated block-aggregation image 40b may be an image having the same size as the input image 40a and expressing low-frequency transform coefficients as pixel values.

Figure 6:
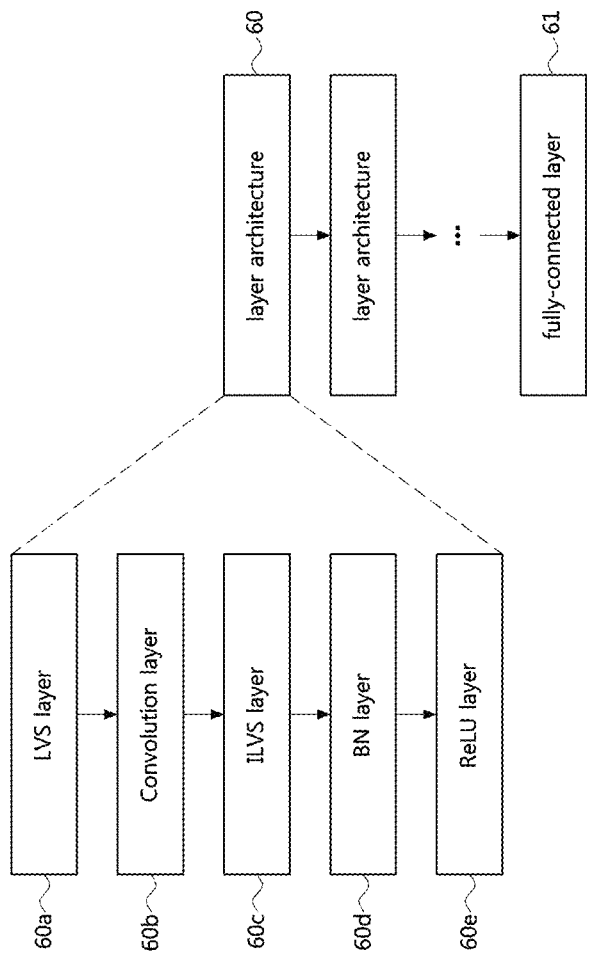
FIG. 6 is a conceptual diagram illustrating a structure of a deep neural network according to an exemplary embodiment of the present disclosure.

FIG. 6 is a conceptual diagram illustrating a structure of a deep neural network according to an exemplary embodiment of the present disclosure.

As described in FIG. 4 above, an exemplary embodiment of the present disclosure may use the first deep neural network to obtain the output low-band image, and may use the second deep neural network to obtain the output high-band image.

Particularly, the first deep neural network and the second deep neural network may be configured in the same structure. For example, as shown in FIG. 6, in the first deep neural network or the second deep neural network, a preconfigured layer architecture 60 may be iteratively connected several times, and a fully-connected layer 61 may be included as the last layer.

Particularly, the preconfigured layer architecture 60 may have a structure in which a local variance stabilization (LVS) layer 60a, a convolution layer 60b, an inverse local variance stabilization (ILVS) layer 60c, a batch normalization (BN) layer 60d, and a rectified linear unit layer 60e are connected in the above-described order. Here, the rectified linear unit layer 60e is a layer that determines whether to activate an output according to an activation function, and may be referred to also as an 'activation layer'. In this case, a ReLU function may be used as the activation function.

Particularly, the LVS layer 60a may perform local variance stabilization on the image input to the neural network, so that the local variance of the compressed Poisson noises within the image are the same in all positions in the image.

On the other hand, the convolution layer 60b may perform convolution for the output of the LVS layer 60a by using previously trained convolution parameters. In this case, the convolution parameters may vary depending on whether the neural network is the first deep neural network or the second deep neural network.

For example, the convolution parameters according to the first deep neural network may be determined by training the first deep neural network so that a mean square error (MSE) between the neural network output for the low-band block-aggregation image obtained from the compressed Poisson noise image and the low-band block-aggregation image obtained from the original image is minimized.

In addition, the convolution parameters according to the second deep neural network may be determined by training the second deep neural network so that an MSE between the neural network output for the high-band image obtained from the compressed Poisson noise image and the high-band image obtained from the original image is minimized.

The trained convolution parameters may be stored in a memory and may be applied when using the first deep neural network or the second deep neural network.

Particularly, the low-band block-aggregation image obtained from the compressed Poisson noise image may be obtained by performing the block-aggregation image generation method according to FIG. 5 on the low-frequency coefficients by using the compressed Poisson noise image as an input image.

Particularly, the high-band image may be obtained by subtracting the inverse block DCT image for the low-band block-aggregation image from the compressed Poisson noise image.

Particularly, the compressed Poisson noise image may be an image restored through decoding after the original image to which the Poisson noises are added is compressed through encoding. Specifically, in the process of generating the compressed Poisson noise image, the Poisson noises having both a specific mean and a specific standard deviation may be added to the original image for training. Thereafter, for the original image for training to which the Poisson noises are added, encoding may be performed by performing a block DCT, dividing the image by a size according to a quantization step determined for each transform coefficient, and rounding it. Thereafter, the compressed Poisson noise image may be obtained by multiplying the encoded transform coefficients by the size according to the quantization step and performing an inverse block DCT.

The compressed Poisson noise image obtained as described above and the original image may be used as inputs for training the first and second deep neural networks.

Figure 7:
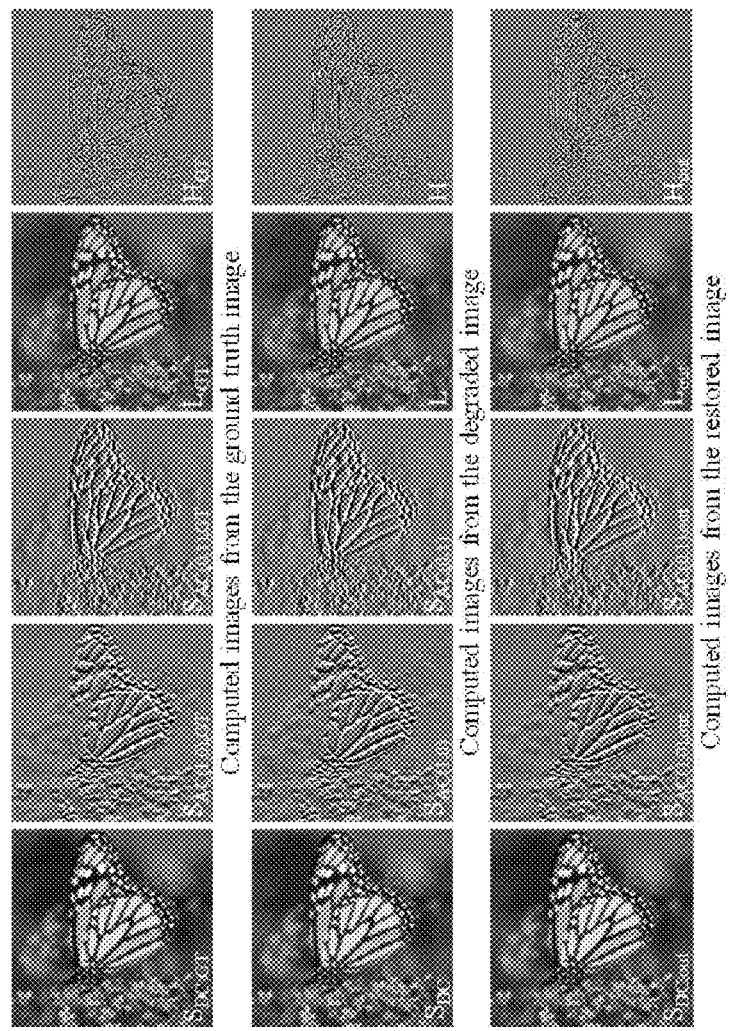
FIG. 7 is an exemplary diagram illustrating experimental results according to each step of a method of removing compressed Poisson noises of an image based on deep neural networks according to an exemplary embodiment of the present disclosure.

FIG. 7 is an exemplary diagram illustrating experimental results according to each step of a method of removing compressed Poisson noises of an image based on deep neural networks according to an exemplary embodiment of the present disclosure.

In FIG. 7, a first row represents images obtained from a clean original image, which are reference images (i.e., ground truth images) for comparing noise removal performances, a second row represents images obtained from a compressed Poisson noise image, and a third row represents images obtained from the compressed Poisson noise image of the second row by removing noises through the first deep neural network and the second deep neural network.

In addition, in each row, the first image is a block-aggregation image for the DC component, the second image is a block-aggregation image for the AC (1,0) component, the third image is a block-aggregation image for the AC (0,1) component, the fourth image is a low-band image, and the fifth image is a high-band image.

Accordingly, the first to third images of the third row correspond to the low-band block-aggregation images 40c according to FIG. 4, the fourth image of the third row corresponds to the output low-band image 40d according to FIG. 4, and the fifth image corresponds to the output high-band image 40f according to FIG. 4.

When the first to third images of each row are compared with each other, it can be confirmed that the block-aggregation images (third row) obtained by removing the noises from the block-aggregation image (second row) for the low-frequency components having the noises have been restored closely to the block-aggregation images (first row) for the original image.

In addition, when comparing the fourth images of the respective rows with each other, the performances of removing noises for the low-band image can be confirmed, and when comparing the fifth images of the respective rows with each other, the performances of removing noises for the high-band image can be confirmed.

Figure 8:
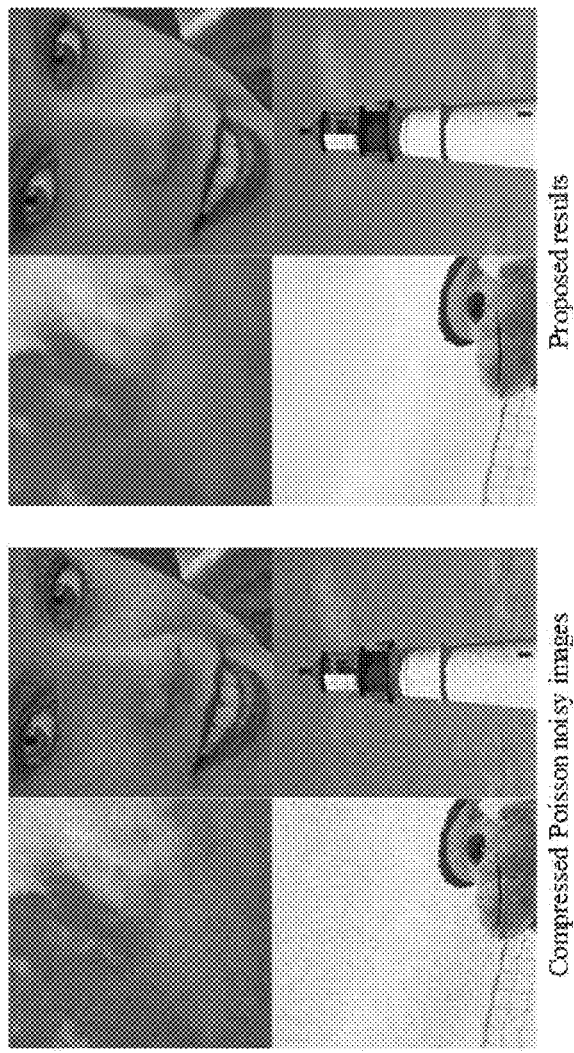
FIG. 8 is an exemplary diagram illustrating noise reduction performance of a method of removing compressed Poisson noises of an image based on deep neural networks according to an exemplary embodiment of the present disclosure.

FIG. 8 is an exemplary diagram illustrating noise reduction performance of a method of removing compressed Poisson noises of an image based on deep neural networks according to an exemplary embodiment of the present disclosure.

As shown in FIG. 8, images located on the left correspond to compressed Poisson noise mages, and images located on the right correspond to images restored closely to the clean original images by removing the compressed Poisson noises from the compressed Poisson noise images using the processes according to FIG. 4. As can be seen from the right images of FIG. 8, using the method of removing compressed Poisson noises of an image based on deep neural networks according to the exemplary embodiment of the present disclosure, the compressed Poisson noises generated in an irregular form can be effectively removed.

Figure 9:
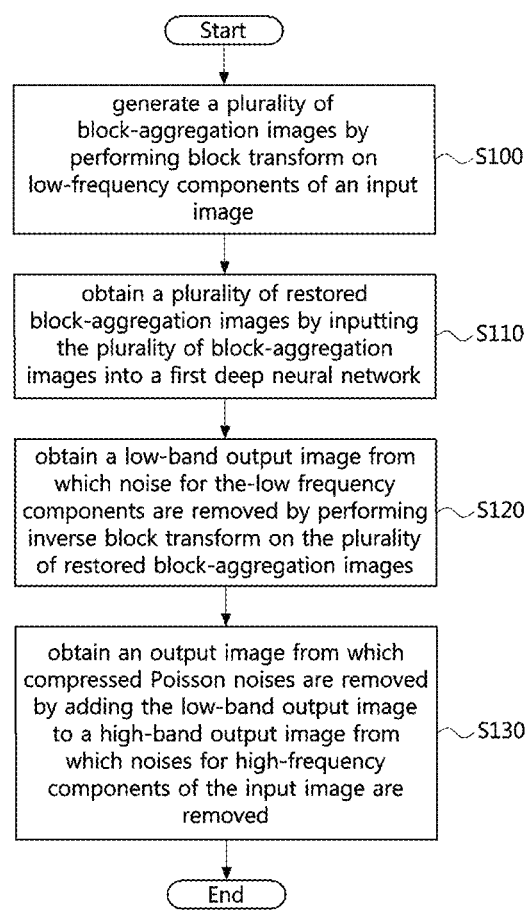
FIG. 9 is a flowchart of a method of removing compressed Poisson noises of an image based on deep neural networks according to an exemplary embodiment of the present disclosure.

FIG. 9 is a flowchart of a method of removing compressed Poisson noises of an image based on deep neural networks according to an exemplary embodiment of the present disclosure.

As shown in FIG. 9, the method of removing compressed Poisson noises of an image based on deep neural networks may comprise a step of generating a plurality of block-aggregation images by performing block transform on low-frequency components of an input image; a step of obtaining a plurality of restored block-aggregation images by inputting the plurality of block-aggregation images into a first deep neural network; a step of generating a low-band output image from which noises for the low-frequency components are removed by performing inverse block transform on the plurality of restored block-aggregation images; and a step of generating an output image from which compressed Poisson noises are removed by adding the low-band output image to a high-band output image from which noises for high-frequency components of the input image are removed.

The method may further comprise, after the step of generating of the plurality of block-aggregation images, a step of generating a low-band input image by performing inverse block transform on the plurality of block-aggregation images; a step of generating a high-band input image by subtracting the low-band input image from the input image; and a step of generating the high-band output image by inputting the high-band input image into a second deep neural network.

The step of generating of the plurality of block-aggregation images may comprise a step of calculating low-frequency block transform coefficients while moving a block of a fixed size by one pixel on the input image; and a step of generating the plurality of block-aggregation images by using coefficients corresponding to a same low-frequency component among the low-frequency block transform coefficients as pixel values according to block movement positions.

The block transform may be a block discrete cosine transform (DCT).

The first deep neural network may have a structure in which a preconfigured layer architecture is iteratively connected, and a fully-connected layer is included as a last layer.

The preconfigured layer architecture may have a structure in which a local variance stabilization (LVS) layer, a convolution layer, an inverse LVS (ILVS) layer, a batch normalization (BN) layer, and a rectified linear unit (ReLU) layer are sequentially connected.

The LVS layer may perform LVS on the image input to the first deep neural network to adjust an LVS of the compressed Poisson noises within the image input to the first deep neural network to be identical in all positions in the image.

The convolution layer may perform convolution on an output of the LVS layer by using previously-trained convolution parameters.

The convolution parameters of the first deep neural network may be determined by training the first deep neural network so that a mean square error (MSE) between an output of the first deep neural network for a low-band block-aggregation image obtained from a compressed Poisson image and a low-band block-aggregation image obtained from an original image is minimized.

The compressed Poisson image may be an image restored by decoding the original image to which Poisson noises are added while being compressed through encoding.

In addition, the method of removing compressed Poisson noises of an image based on deep neural networks may comprise the components and steps described in FIGS. 1 to 6, and detailed descriptions are omitted to prevent overlapping descriptions.

Figure 10:
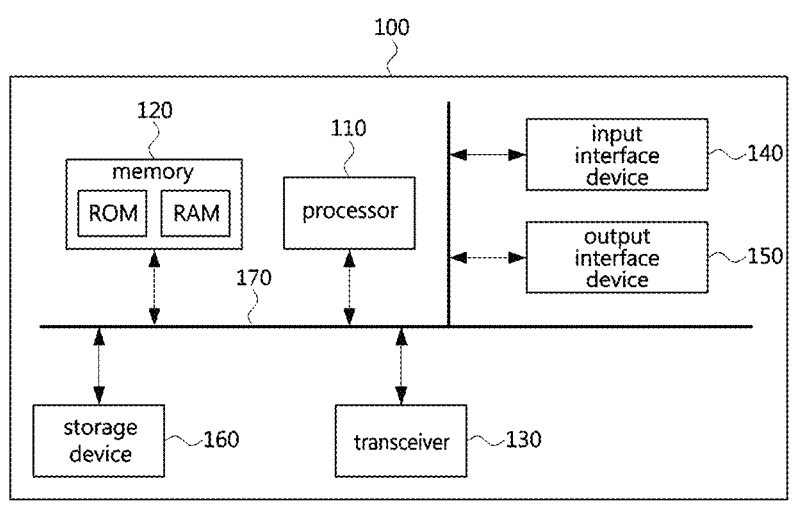
FIG. 10 is a diagram illustrating hardware configuration of an apparatus for removing compressed Poisson noises of an image based on deep neural networks according to an exemplary embodiment of the present disclosure.

FIG. 10 is a diagram illustrating hardware configuration of an apparatus for removing compressed Poisson noises of an image based on deep neural networks according to an exemplary embodiment of the present disclosure.

As shown in FIG. 10, an apparatus 100 for removing compressed Poisson noises of an image based on deep neural networks may comprise at least one processor 110 and a memory 120 storing instructions causing the at least one processor to perform at least one step.

Here, the at least one processor 110 may refer to a central processing unit (CPU), a graphics processing unit (GPU), or a dedicated processor on which the methods according to the exemplary embodiments of the present disclosure are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

In addition, the apparatus 100 may further comprise a transceiver 130 performing communications via a wired or wireless network. In addition, the apparatus 100 may further include an input interface device 140, an output interface device 150, a storage device 160, and the like. The components included in the apparatus 100 may be connected by a bus 170 to communicate with each other.

The at least one step may comprise a step of generating a plurality of block-aggregation images by performing block transform on low-frequency components of an input image; a step of obtaining a plurality of restored block-aggregation images by inputting the plurality of block-aggregation images into a first deep neural network; a step of generating a low-band output image from which noises for the low-frequency components are removed by performing inverse block transform on the plurality of restored block-aggregation images; and a step of generating an output image from which compressed Poisson noises are removed by adding the low-band output image to a high-band output image from which noises for high-frequency components of the input image are removed.

The at least one step may further comprise, after the step of generating of the plurality of block-aggregation images, a step of generating a low-band input image by performing inverse block transform on the plurality of block-aggregation images; a step of generating a high-band input image by subtracting the low-band input image from the input image; and a step of generating the high-band output image by inputting the high-band input image into a second deep neural network.

The step of generating of the plurality of block-aggregation images may comprise a step of calculating low-frequency block transform coefficients while moving a block of a fixed size by one pixel on the input image; and a step of generating the plurality of block-aggregation images by using coefficients corresponding to a same low-frequency component among the low-frequency block transform coefficients as pixel values according to block movement positions.

The block transform may be a block discrete cosine transform (DCT).

The first deep neural network may have a structure in which a preconfigured layer architecture is iteratively connected, and a fully-connected layer is included as a last layer.

The preconfigured layer architecture may have a structure in which a local variance stabilization (LVS) layer, a convolution layer, an inverse LVS (ILVS) layer, a batch normalization (BN) layer, and a rectified linear unit (ReLU) layer are sequentially connected.

The LVS layer may perform LVS on the image input to the first deep neural network to adjust an LVS of the compressed Poisson noises within the image input to the first deep neural network to be identical in all positions in the image.

The convolution layer may perform convolution on an output of the LVS layer by using previously-trained convolution parameters.

The convolution parameters of the first deep neural network may be determined by training the first deep neural network so that a mean square error (MSE) between an output of the first deep neural network for a low-band block-aggregation image obtained from a compressed Poisson image and a low-band block-aggregation image obtained from an original image is minimized.

The compressed Poisson image may be an image restored by decoding the original image to which Poisson noises are added while being compressed through encoding.

For example, the apparatus 100 for removing compressed Poisson noises of an image based on deep neural networks may be a desktop computer, a laptop computer, a notebook, a smart phone, a tablet PC, a mobile phone, a smart watch, a smart glass, an e-book reader, a portable multimedia player (PMP), a portable game playing machine, a navigation device, a digital camera, a digital multimedia broadcasting (DMB) player, a digital audio recorder, a digital audio player, a digital video recorder, a digital video player, a personal digital assistant (PDA), or the like.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for removing compressed Poisson noises in an image, based on deep neural networks, the method comprising:
    generating a plurality of block-aggregation images by performing block transform on low-frequency components of an input image;
    obtaining a plurality of restored block-aggregation images by inputting the plurality of block-aggregation images into a first deep neural network;
    generating a low-band output image from which noises for the low-frequency components are removed by performing inverse block transform on the plurality of restored block-aggregation images; and
    generating an output image from which compressed Poisson noises are removed by adding the low-band output image to a high-band output image from which noises for high-frequency components of the input image are removed.

2. The method according to claim 1, further comprising, after the generating of the plurality of block-aggregation images,
    generating a low-band input image by performing inverse block transform on the plurality of block-aggregation images;
    generating a high-band input image by subtracting the low-band input image from the input image; and
    generating the high-band output image by inputting the high-band input image into a second deep neural network.

3. The method according to claim 1, wherein the generating of the plurality of block-aggregation images comprises:
    calculating low-frequency block transform coefficients while moving a block of a fixed size by one pixel on the input image; and
    generating the plurality of block-aggregation images by using coefficients corresponding to a same low-frequency component among the low-frequency block transform coefficients as pixel values according to block movement positions.

4. The method according to claim 1, wherein the block transform is a block discrete cosine transform (DCT).

5. The method according to claim 1, wherein the first deep neural network has a structure in which a preconfigured layer architecture is iteratively connected, and a fully-connected layer is included as a last layer.

6. The method according to claim 5, wherein the preconfigured layer architecture has a structure in which a local variance stabilization (LVS) layer, a convolution layer, an inverse LVS (ILVS) layer, a batch normalization (BN) layer, and a rectified linear unit (ReLU) layer are sequentially connected.

7. The method according to claim 6, wherein the LVS layer performs LVS on the image input to the first deep neural network to adjust an LVS of the compressed Poisson noises within the image input to the first deep neural network to be identical in all positions in the image.

8. The method according to claim 6, wherein the convolution layer performs convolution on an output of the LVS layer by using previously-trained convolution parameters.

9. The method according to claim 8, wherein the convolution parameters of the first deep neural network are determined by training the first deep neural network so that a mean square error (MSE) between an output of the first deep neural network for a low-band block-aggregation image obtained from a compressed Poisson image and a low-band block-aggregation image obtained from an original image is minimized.

10. The method according to claim 9, wherein the compressed Poisson image is an image restored by decoding the original image to which Poisson noises are added while being compressed through encoding.

11. An apparatus for removing a compressed Poisson noise in an image, based on deep neural networks, the apparatus comprising at least one processor and a memory storing instructions causing the at least one processor to perform at least one step, wherein the at least one step comprises:

generating a plurality of block-aggregation images by performing block transform on low-frequency components of an input image;

obtaining a plurality of restored block-aggregation images by inputting the plurality of block-aggregation images into a first deep neural network;

generating a low-band output image from which noises for the low-frequency components are removed by performing inverse block transform on the plurality of restored block-aggregation images; and generating an output image from which compressed Poisson noises are removed by adding the low-band output image to a high-band output image from which noises for high-frequency components of the input image are removed.

12. The apparatus according to claim 11, wherein the at least one step further comprises, after the generating of the plurality of block-aggregation images, generating a low-band input image by performing inverse block transform on the plurality of block-aggregation images;

generating a high-band input image by subtracting the low-band input image from the input image; and generating the high-band output image by inputting the high-band input image into a second deep neural network.

13. The apparatus according to claim 11, wherein the generating of the plurality of block-aggregation images comprises:

calculating low-frequency block transform coefficients while moving a block of a fixed size by one pixel on the input image; and generating the plurality of block-aggregation images by using coefficients corresponding to a same low-frequency component among the low-frequency block transform coefficients as pixel values according to block movement positions.

14. The apparatus according to claim 11, wherein the block transform is a block discrete cosine transform (DCT).

15. The apparatus according to claim 11, wherein the first deep neural network has a structure in which a preconfigured layer architecture is iteratively connected, and a fully-connected layer is included as a last layer.

16. The apparatus according to claim 15, wherein the preconfigured layer architecture has a structure in which a local variance stabilization (LVS) layer, a convolution layer, an inverse LVS (ILVS) layer, a batch normalization (BN) layer, and a rectified linear unit (ReLU) layer are sequentially connected.

17. The apparatus according to claim 16, wherein the LVS layer performs LVS on the image input to the first deep neural network to adjust an LVS of the compressed Poisson noises within the image input to the first deep neural network to be identical in all positions in the image.

18. The apparatus according to claim 16, wherein the convolution layer performs convolution on an output of the LVS layer by using previously-trained convolution parameters.

19. The apparatus according to claim 18, wherein the convolution parameters of the first deep neural network are determined by training the first deep neural network so that a mean square error (MSE) between an output of the first deep neural network for a low-band block-aggregation image obtained from a compressed Poisson image and a low-band block-aggregation image obtained from an original image is minimized.

20. The apparatus according to claim 19, wherein the compressed Poisson image is an image restored by decoding the original image to which Poisson noises are added while being compressed through encoding.

* * * * *